March 21, 1933.    A. E. YOUNG    1,902,112
MEASURING APPARATUS
Filed Dec. 12, 1931
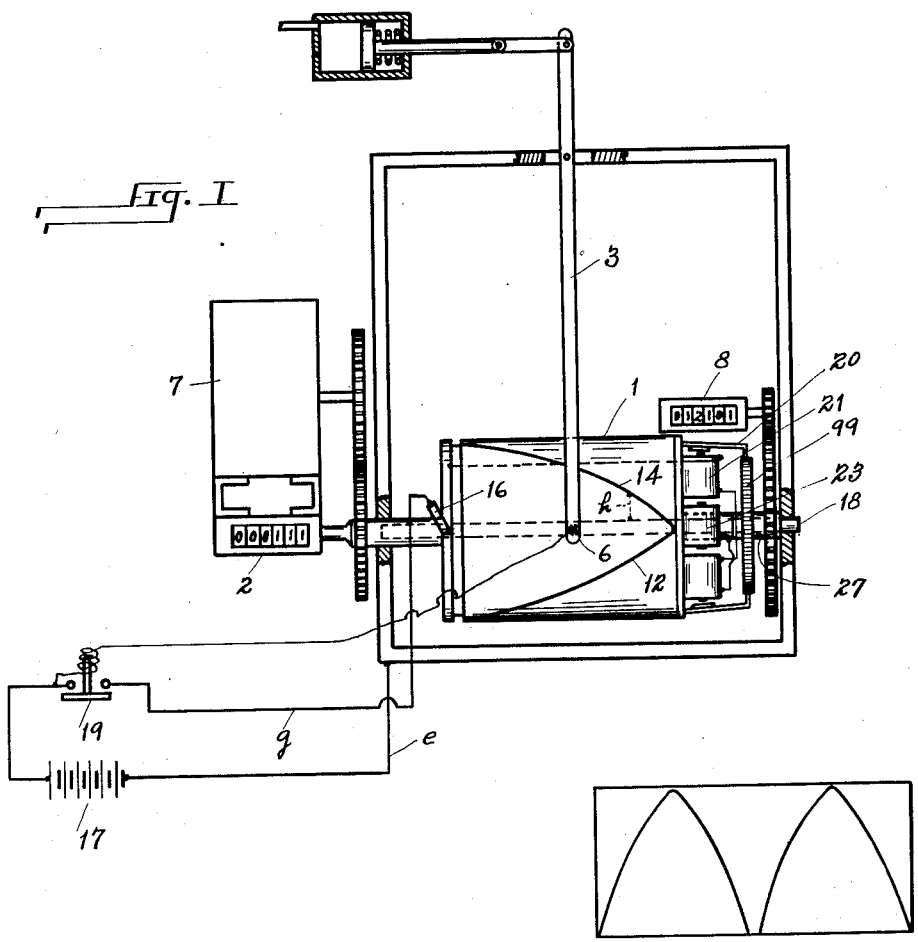
Fig. I
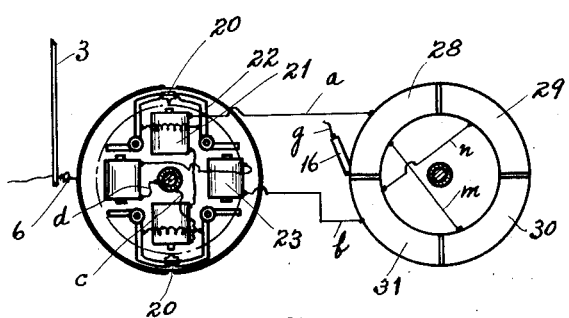
Fig. II
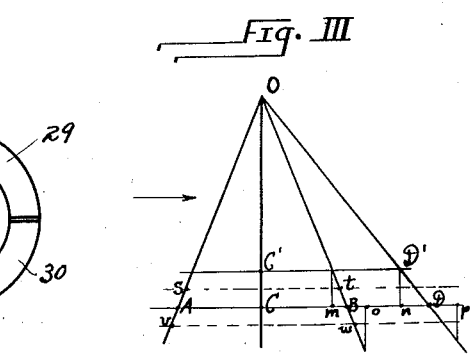
Fig. III
Fig. IV
INVENTOR
Archer E. Young
by Christy Christy and Wharton
his attorneys Patented Mar. 21, 1933

1,902,112

UNITED STATES PATENT OFFICE

ARCHER E. YOUNG, OF PITTSBURGH, PENNSYLVANIA

MEASURING APPARATUS

Application filed December 12, 1931. Serial No. 580,580.

This invention relates to apparatus for aggregating the value of a variable through a prolonged interval of time. It involves a constantly moving body, a tally, and a clutch arranged between the constantly moving body and the tally, and means for rendering the clutch effective during a greater or less portion of such interval of time, according to the value of the variable. Such being the case, the tally reading will be an index of the value of the variable.

In the accompanying drawing Fig. I is a diagrammatic view partly in elevation and partly in section of apparatus for measuring gas, in which my present invention is embodied. The invention is of wide and general applicability, and the gas meter is merely an example of its use. Fig. II is a diagrammatic view showing the scheme of electric wiring, and in this view certain rotating parts are shown in elevation. Fig. III is a diagrammatic projection of the surface of a certain cylinder included in the apparatus of Fig. I, projected in a single plane. Fig. IV is a further explanatory diagram.

A moving member, in this case a rotatable cylinder 1, is driven by a positive meter 7. It may be understood that the stream of gas to be measured, or a predetermined fraction of the stream, passes through the meter 7, and that, consequently, cylinder rotation accords with volumetric flow of gas, and is an index of quantity—subject, however, to error due to fluctuation in the value of the pressure to which the gas is subject as it passes through the meter. With the positive meter 7 a tally 2 may be immediately associated. This is a well-known arrangement. The tally 2 will afford indication of the volume of gas passed; but as an indication of quantity, correction for variation in pressure is lacking.

Associated with cylinder 1 a tally 8 is provided. The drive shaft 27 of the tally is conveniently aligned axially with cylinder 1. The particular arrangement may, conveniently, be that shown in which shaft 27 is hollow, and the axle 18 of the cylinder extends through the shaft 27. Between cylinder 1 and shaft 27 a clutch is arranged, which clutch when closed effects rotation of shaft 27 in unison with the cylinder. To such end the shaft carries integrally a disk 99, and the cylinder carries arms 20 which extend beyond the end of the cylinder and overhang the face of the disk. Disk and arms may be severally serrated and toothed, to insure intermittent integration of the parts as the arms swing. Normally the arms 20 stand remote, free of engagement with disk 99, and from such remote and inactive position they are, by means of electromagnets 21, drawn to engagement with the disk. The electromagnets 21 also are borne by the cylinder.

When by the energizing of electromagnets 21 the arms 20 are drawn to clutch-closing position, pairs of spring-backed latches 22, which had previously rested against the sides of arms 20, spring to locking position behind the arms and hold them locked in clutch-closing position.

From locking position the latches 22 are by means of electromagnets 23 withdrawn, to allow the arms 20, in response to spring tension, to resume normal clutch-opening position. The electromagnets 23 also are carried by cylinder 1.

An electric contact-piece 6 moves, in response to variation in the pressure of the gas, along a path adjacent to and extending longitudinally of cylinder 1, and to such end contact-piece 6 is mounted on a beam 3 which by known means is caused to swing in response to such pressure variation.

Cylinder 1 carries, insulated upon it, two contact strips 12 and 14 which, extending longitudinally of the cylinder, diverge circumferentially. It may be found convenient to make the two strips of the pair electrically continuous; and it may be found convenient to equip the cylinder with a plurality of pairs of strips. These matters are indicated in the drawing.

A source of electric power is provided, indicated at 17, and this source of power is, by a lead $e$, grounded, and the strips also, borne by the cylinder, are, by a lead $h$, grounded. Mounted integrally upon and coaxially with cylinder 1, but insulated electrically in their mounting, are the segments 28, 29, 30, 31 of a broken ring of conducting material. These segments are of equal circumferential extent, somewhat less than 90° each, and are insulated from one another in the mounting upon which they are carried. These segments are electrically connected by leads $m$, $n$ in diagonally opposed pairs, and the pairs are connected in series; pair 28, 30, through lead $a$, with electromagnets 21; pair 29, 31, through lead $b$, with electromagnets 23. The pairs of electromagnets in turn, so connected in series, are grounded through leads $c$ and $d$.

As in the course of operation cylinder 1 turns (counterclockwise, as viewed from the right, Fig. I) and contact-piece 6 makes contact with strip 12, a circuit of high resistance is first completed from source 17 through the coil of a relay 19; thereupon the relay is closed and a circuit of low resistance is completed from the source through lead $g$, a brush 16 (which bears on the segment assembly), segment 28, and electromagnets 21. The energizing of the electromagnets 21 effects the closing of the clutch; and at once the latches 22, closing behind arms 20, become effective to hold the arms in clutch-closing position.

When in further rotation of cylinder 1 the contact-piece 6 comes to contact with strip 14, the relay is first closed, and then a low-resistance circuit is completed from source 17 through lead $g$, brush 16, segment 29 (which, by the turning of the cylinder, has now come beneath the brush), lead $b$, and electromagnets 23. The energizing of electromagnets 23 effects the swinging of latches 22 from locking to unlocking position; whereupon arms 20, released, swing under spring tension back to normal, clutch-opening position. The latches, being presently released, rest against the sides of the arms 20.

During the interval of successive contacts between contact-piece 6 and strips 12 and 14 the clutch is closed and tally 8 is being driven.

By equipping cylinder 1 with two pairs of contact strips 12 and 14 (and it will be understood that the cylinder of Fig. I is on its opposite side equipped with a second pair) and by providing, in correspondence with the two pairs of contact strips, two pairs of ring segments 28, 29 and 30, 31, the tally 8 is driven during two intervals in the course of each complete rotation of cylinder 1; the ratio of the angular value of those intervals, each to the 360° of a complete rotation of cylinder 1, will vary, according to the instant value of the pressure. Accordingly, it becomes a matter of the proportioning of parts to obtain in tally 8 direct reading of quantity of gas passed, corrected for variation in pressure.

The diagram Fig. IV serves to illustrate the value of that arrngement of the strips upon the surface of the moving member (the cylinder 1) which constitutes my present invention. Let it be understood that the lines CO and DO indicate the positions of a divergent pair of strips borne by a member which moves in the direction indicated by the arrow, and that one of the strips extends along the line CO, coincident with the line in which the contact-piece moves. The interval at which the strips are separated, measured in the direction in which the member moves, increases from the point O downward, to the line CD; and, as has been explained, the contact-piece, moving downward as pressure increases, makes successive contacts with the two strips located along lines CO and DO, at an increasing interval.

The variable factor, pressure, is uncontrollable in its variability, and its value may change, and, practically, it does (in some degree at least) change, in the interval of time between contacts of the contact-piece with the two strips. Let it be supposed that in the interval alluded to the pressure has decreased, and that the contact-piece has changed its position from the position indicated by the line CD to the position indicated by the line C'D'. The actual value of the interval between successive contacts will then be C$n$, a value less than CD by the distance $n$D; and (assuming the decrease in pressure to have been at a uniform rate) the value will be erroneous, in an amount represented by one-half of the distance $n$D. Correspondingly, if during the interval mentioned the pressure has increased by a like increment, the error will be in an amount represented by one-half the distance D$p$.

With strips so placed, having results such as have been indicated, I bring into comparison strips diverging one from another at the same angle of divergence, but so placed that they are equally and oppositely inclined to the line in which the contact-piece moves. The strips so changed in position lie in the lines AO and BO. Under this altered condition, decrease and increase of pressure during the interval between the succeeding contacts of the contact-piece with the two strips, and in like amounts as in the cases already considered, will result in errors in amounts represnted by one-half the distance $m$B and B$o$. Since it is clearly demonstrable that the distance $m$B is less than the distance $n$D, and the distance B$o$ is less than the distance D$p$, it is manifest that, under fluctuating conditions of pressure, the arrangement of strips in opposite inclination with respect to the direction of movement of the contact-piece will afford more accurate results than the arrangement in which one strip extends along the line of contact-piece movement. I gain best results by arranging the strips, as indicated in Fig. I, in position which are symmetrical with respect to the line of movement of the contact-piece. It is additionally demonstrable that if, during the interval between the successive contacts of contact-piece 6 with the two strips 12 and 14, a change of pressure occurs at a constant rate (and changes ordinarily are substantially constant through such brief intervals), the symmetrical arrangement indicated in Figs. I and III, and diagrammatically indicated in lines AO, BO of Fig. IV, will afford an exactly accurate operation of the tally. In the case of decrease of pressure, the line $Am$ equals the line $st$ (the mean interval between the strips), and, in the case of increase of pressure, the line $Ao$ equals the line $vw$.

I claim as my invention:

1. In apparatus for aggregating the value of a variable during a prolonged interval of time, a moving member, a tally, means for uniting intermittently the moving member and the tally, electrically operated means controlling such uniting means, such last-named means including a contact-piece movable in response to the value of the variable and in a direction transverse to the direction in which the said member moves, and two contact strips borne by said moving member and with which said contact-piece makes successive contacts as the moving member moves, the two said strips extending divergently one from the other and oppositely divergent with respect to the line of direction of the contact-piece.

2. The structure of claim 1, the two contact strips being symmetrically arranged with respect to the line of movement of the contact-piece.

3. In apparatus for aggregating the value of a variable during a prolonged interval of time, a rotatable member, a tally, a second member movable in response to change in the value of the variable along a path adjacent to and in a direction transverse to the direction of rotation of the said rotatable member, means for driving the tally intermittently in response to rotation of said rotatable member, such means including cooperating parts borne by the rotatable member and by the said second movable member, the part borne by the rotatable member extending upon the surface thereof along two lines which diverge one from the other and which diverge oppositely with respect to the path of the said second movable member.

In testimony whereof I have hereunto set my hand.

ARCHER E. YOUNG.